June 23, 1942.  A. R. VAN C. WARRINGTON  2,287,504
PROTECTIVE APPARATUS
Filed Jan. 21, 1941
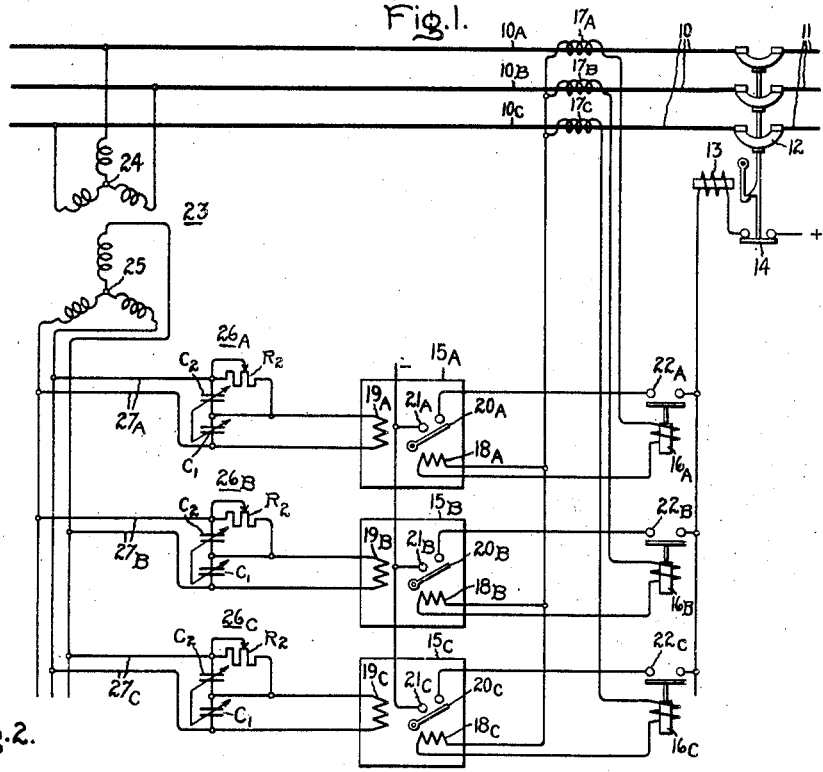
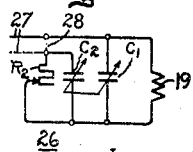
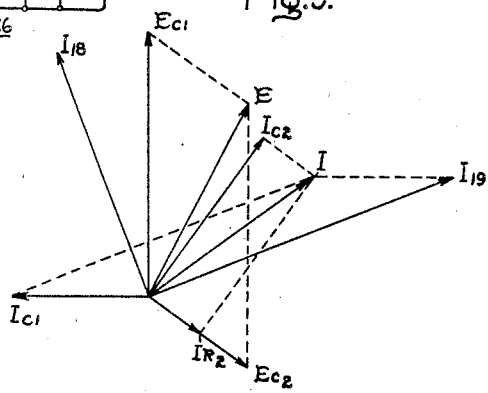
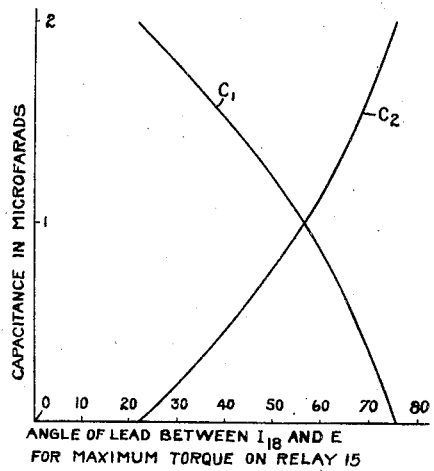
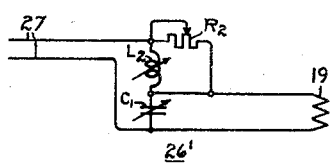
Inventor:
Albert R. van C. Warrington,
by Harry E. Dunham
His Attorney.

Patented June 23, 1942

2,287,504

UNITED STATES PATENT OFFICE 2,287,504

PROTECTIVE APPARATUS

Albert R. van C. Warrington, Wallingford, Pa., assignor to General Electric Company, a corporation of New York Application January 21, 1941, Serial No. 375,209

11 Claims. (Cl. 175—294)

My invention relates to protective apparatus for electric circuits and more particularly to protective apparatus which employ instantaneous power directional relay elements designed to respond to the direction of the current flowing in a power system with respect to a comparison voltage which is impressed across the potential coils of the power directional relay elements.

Severe faults, such as heavy short circuits occurring on a power line, especially if in the immediate vicinity of the relaying station where the protective relays are located, may reduce the voltage substantially to zero. Under such conditions relays, particularly of the instantaneous directional type whose operation is dependent upon the voltage of the line, may fail to operate because of the reduced or substantially zero voltage applied to the potential coil of the relay. Any means for obtaining adequate amplification of the voltage on the relay windings under abnormal conditions must be made inoperative at normal voltage; otherwise the relay windings will burn up at normal line voltage or the design would be impractical. To overcome this difficulty encountered in instantaneous power directional relays, the potential circuits of the relay are provided with the feature often referred to as "memory action" since, in effect, this feature enables the maintenance of a potential on the relay in the same phase relation as the potential existing just prior to the short-circuit condition.

To obtain such memory action, the potential circuits of power directional relays have included various arrangements of capacitance and inductance which provide a resonant circuit under certain conditions. For example, in my prior Patent 1,895,357, granted January 24, 1933, and assigned to the same assignee as the present invention, a memory-action scheme for power directional relays has been disclosed in one embodiment thereof wherein the potential coil is connected in a series resonant circuit, the resonance of which is impaired under normal voltage conditions by saturation of the potential winding. However, under low-voltage conditions, the circuit comes into resonance so as to amplify the voltage and thus provide memory action. A parallel resonant arrangement for obtaining memory action is also disclosed and the prior art includes different arrangements using series or parallel resonant circuits in a somewhat similar manner. In all of these arrangements, however, the current flowing in the potential coil bears a fixed angular relationship to the line potential serving as the source for energizing the potential coil of the power directional relay.

Instantaneous power directional relays are often of the induction type having a current and potential winding causing a resulting torque on the movable element of the relay which is proportional to the product of the currents flowing in these respective windings multiplied by the sine of the angle between them. It is obvious that, for maximum torque, these currents should be displaced in phase by ninety electrical degrees. With the prior art arrangements referred to above, memory action at maximum relay torque for instantaneous power directional relays was obtainable only at an angle between applied relay current and voltage fixed by the design of the relay, the particular angle depending upon whether a series or parallel resonant arrangement was utilized. With series tuning, for example, the maximum torque on the movable element of the relay would be obtained when the line voltage or voltage source for the relay was displaced in phase from the current source for the relay by ninety electrical degrees, and any range with respect to this angle would require a shifting of the current in the current coil, since adding means to shift the potential would interfere with the tuning. It is well known to the art that the phase shifting means for the current circuit are wasteful of power and hard to control on account of the low voltage in a current circuit.

As an example, with power directional relays of the induction type, memory action based on series resonance can only be obtained with maximum relay torque when the current of the current winding lags the potential source for energizing the potential winding by ninety electrical degrees. With such an arrangement, difficulties are encountered in the case of an arcing bus fault for, under such unity power factor conditions, no torque would be applied to the movable element of the relay. Somewhat similar difficulties exist with parallel resonant circuits. It would be desirable to be able to obtain memory action of the voltage element of power directional relays at any desired angle of the current flowing in the potential winding with reference to the potential of the circuit being protected so that maximum torque operation of the relay may be obtained for the power factor which exists under the majority of fault conditions liable to occur and so that the relay torque for any type of fault which might exist would never be less than seventy per cent of the maximum obtainable with the same magnitudes of applied current and voltage.

Accordingly, it is an object of my invention to provide a new and improved voltage supply means for power directional relays so that, even in the case of a dead short circuit in the immediate vicinity of the relaying point, the voltage which is applied to the directional element will be maintained at a sufficiently high value to insure satisfactory operation of the power directional relay, though the circuit voltage may be zero.

It is another object of my invention to provide a new and improved memory-action scheme for power directional relays which will insure satisfactory operation thereof under all fault conditions.

It is a further object of my invention to provide a memory-action scheme for relays in which any desired angle of the current in the potential winding of the relay with reference to the potential of the power circuit may be obtained.

Further objects and advantages of my invention will become apparent as the following description proceeds and the features of novelty which characterize my invention will be pointed out with particularity in the claims annexed to and forming a part of this specification.

For a better understanding of my invention, reference may be had to the accompanying drawing, in which Fig. 1 is a diagrammatic view of the circuit and apparatus embodying my invention; Fig. 2 is the potential circuit of the relay of the system of Fig. 1 rearranged to illustrate better the operation thereof under certain conditions; Fig. 3 is a vector diagram to aid in the understanding of my invention; Fig. 4 is a graphical representation illustrating the particular relationship of certain quantities existing in the apparatus and system disclosed in Fig. 1, and Fig. 5 is a modification of my invention as illustrated in Fig. 1.

Referring now to Fig. 1, I have shown my invention as applied by way of example to an electrical system comprising a polyphase alternating-current power line 10, having three phases 10a, 10b, and 10c, respectively, which is connected to a polyphase line or bus 11 through latched closed circuit breaker 12 having a trip coil 13 and an "a" switch 14 which is closed when the circuit breaker is closed and open when the circuit breaker is open.

For controlling the circuit breaker 12 in response to abnormal line conditions, I have provided a protective system which includes for each phase of power line 10 a power directional relay 15 and a suitable electroresponsive device 16 which has been illustrated for simplicity as an overcurrent relay but which might equally well be a distance relay or any other device responsive to abnormal conditions on the power line 10. The directional relay 15 is provided in order to enable the protective system to decide whether or not the fault is on the protected section, by determining whether the power flow is to or from the protected section. I have designated the power directional relays 15 and electroresponsive devices 16 by the same reference numerals for all of the phases of power line 10. However, I have applied the appropriate subscript A, B, or C to these numerals to characterize the particular phase conductor of power line 10 with which they are associated.

Electroresponsive devices 16a, 16b, and 16c, which for the sake of simplifying the drawing have been illustrated as overcurrent relays, are arranged to be energized from suitable current transformers having their secondary windings 17a, 17b, and 17c associated with the corresponding phase conductor of power line 10. The power directional relays 15a, 15b, and 15c, on the other hand, are illustrated as of the induction type, each having a current winding 18 and a potential winding 19 and a movable element 20, the torque of which is proportional to the product of the currents flowing in the current and potential windings multiplied by the sine of the phase angle between these currents, as is well understood by those skilled in the art. The movable element 20 of each of the power directional relays 15 is adapted to close contacts 21, which are connected in series with contacts 22 controlled by the corresponding electroresponsive device 16, and which, in turn, are connected in the energization circuit of tripping coil 13 of circuit breaker 12. Tripping of circuit breaker 12 is initiated whenever both the contacts 22 of any electroresponsive device 16a, 16b, or 16c and the contacts 21 of the corresponding power directional relay 15 are closed.

The current coils 18 of power directional relays 15 are energized with currents proportional to the line currents on power line 10, each being connected in series with the corresponding electroresponsive device 16 energized from the appropriate secondary winding 17 of the current transformers associated with power line 10. The potential windings 19, on the other hand, are energized from a potential transformer 23 illustrated as having a Y-connected primary winding 24 connected across power line 11 and a Y-connected secondary winding 25 serving as a source for energizing potential coils 19. In the specific embodiment of Fig. 1, I have illustrated power directional relays 15 with the so-called "quadrature connections," which will be understood by those skilled in the art as referring to connections for power directional relays 15 wherein there is imparted a ninety degree relationship between the potential applied to the potential coil 19 and the current applied to the current coil 18 for unity power-factor conditions of power line 10. It will be understood that the particular energization of the potential and current windings of power directional relays 15 may be varied in accordance with the known practice with respect to such relays, since the particular arrangement of connections forms no part of my invention.

According to my invention, the potential coils 19 of power directional relays 15 are not energized directly from the secondary winding 25 of potential transformer 23 but instead are energized through networks generally indicated at 26 which have the effect of maintaining the voltage across potential coil 19 for a few cycles after the line voltage has been reduced substantially to zero by virtue of a severe fault nearby or, in other words, providing memory action for power directional relays 15.

Each of the networks 26a, 26b, and 26c comprise capacitors $C_1$ and $C_2$ and an adjustable resistor $R_2$. The networks 26 are energized from the respective circuits 27a, 27b and 27c, each associated with the secondary winding 25 of potential transformer 23. Capacitors $C_1$ and $C_2$ of each network are connected in series across the corresponding circuit 27 while adjustable resistor $R_2$ is connected across capacitor $C_2$ and the corresponding potential coil 19 is connected across capacitor $C_1$. The capacitors $C_1$ and $C_2$ are adjustable in such a manner that the sum of their capacitances is constant and the capacitive reactance of said capacitors $C_1$ and $C_2$ connected in parallel with each other is equal to the inductive reactance of potential coil 19.

Referring now to Fig. 2, which illustrates one of the memory-action networks 26 in a somewhat rearranged manner to illustrate better the operation of my invention, it will be observed that, when a potential is supplied across circuit 27, a current resonant condition of the network would require that $I_{C1}+I_{C2}-I_{19}=0$ where $I_{C1}$, and $I_{C2}$, and $I_{19}$ represent the currents flowing through condensers $C_1$ and $C_2$ and potential coil 19, respectively. Returning to Fig. 1 it will be obvious that the above equation cannot be satisfied when a potential is impressed across circuit 27 unless the current through $R_2$ is zero, which would require an ohmic value of $R_2$ equal to infinity. When a severe fault occurs across power line 10, the potential across circuit 27 is reduced substantially to zero and, under such conditions, the memory-action network 26 of Fig. 1 may be simplified by short circuiting or shunting circuit 27 as shown by the dotted line 28 in Fig. 2. Since the sum of the capacitances $C_1$ and $C_2$ is such as to provide the same capacitive impedance as the inductive impedance of potential coil 19, a current resonant condition of memory-action network 26 exists when circuit 27 is shunted as by 28, which is effectively the case under severe short-circuit conditions in the immediate vicinity of relays 15. This resonant condition maintains an oscillation at system frequency in the network 26 so that the frequency of current flowing in the coil 19 of the network remains substantially the same during resonance as when voltage was impressed across circuit 27. The presence of the resistance $R_2$, if relatively large, does not substantially interfere with the oscillation since it simply provides a loss circuit, causing the oscillations of the memory circuit to attenuate with a rapidity inversely dependent upon the ohmic value of $R_2$. The real purpose of resistor $R_2$, which is illustrated as adjustable, is to provide the desired means for obtaining a fine adjustment of the angular relationship between the current flowing in potential coil 19 and the potential applied across circuit 27 since such fine adjustment cannot be satisfactorily obtained as a practical matter by varying the individual capacitances of capacitors $C_1$ and $C_2$, the sum of which must always be constant as referred to above. It will be understood by those skilled in the art that resistor $R_2$ could be omitted without impairing the memory-action operation of network 26.

From the above discussion, it will be observed that, whenever a short circuit seriously reduces the potential across circuit 27, memory action network 26 causes oscillations at the system frequency to continue for a time so as effectively to maintain the potential of potential coil 19 for a short interval to insure correct operation of power directional relay 15.

The current and potential conditions of one of the memory-action networks 26 and associated power directional relay 15 for certain predetermined circuit constants are illustrated vectorially in Fig. 3, where $I_{18}$ represents vectorially the current flowing in current coil 18 and, consequently, the phase position of one of the line currents of power line 11 and the vector E represents the corresponding line-to-line potential impressed across circuit 27 and serving as the source of potential for the corresponding potential coil of power directional relay 15. It is desirable by means of network 26 not only to obtain memory action but also to obtain a ninety-degree relationship between the current $I_{18}$ flowing in current coil 18 and the current $I_{19}$ flowing in the potential coil 19 of the corresponding power directional relay 15 to provide maximum torque conditions on the movable element 20 thereof at the angle between E and $I_{18}$ which is fixed by the design of the circuit protected by the relay. The vector $I_{19}$ has therefore been illustrated in Fig. 3 as lagging $I_{18}$ by substantially ninety degrees.

The potential E, as is obvious from Fig. 1, is equal to the sum of the potentials across capacitors $C_1$ and $C_2$ represented by the vectors $E_{C1}$ and $E_{C2}$, respectively. The current flowing through capacitor $C_1$ leads the potential $E_{C1}$ by ninety electrical degrees and is represented in Fig. 3 by the vector $I_{C1}$. The current flowing in circuit 27 is equal to the vector sum of the currents $I_{C1}$ and $I_{19}$ shown vectorially as I in Fig. 3. However, the current I is also the vector sum of the current flowing through resistor $R_2$, which is in phase with the potential $E_{C2}$ and illustrated as $I_{R2}$ in Fig. 3, and the current flowing through capacitor $C_2$ which leads the voltage $E_{C2}$ by ninety degrees and is represented by the vector $I_{C2}$ in Fig. 3. It will be observed from Fig. 3 that, for the predetermined circuit constants used, memory action at maximum torque of power directional relay 15 with quadrature connections is obtained when the line current of power circuit 10 leads the corresponding potential across circuit 27 in the neighborhood of forty-five degrees. By adjusting the individual values of capacitance of $C_1$ and $C_2$, although maintaining the sum thereof constant, memory action at maximum torque of power directional relay 15 for various angular relationships between the current $I_{18}$ and voltage E may be obtained over the range of zero to ninety degrees lead. In Fig. 4, I have illustrated the particular values of capacitance of capacitors $C_1$ and $C_2$ necessary to obtain maximum torque on the movable element 20 of power directional relay 15 for various angles of lead between E and $I_{18}$ where the sum of the capacitances of $C_1$ and $C_2$ is maintained constant at two microfarads.

The operation of the protective system of Fig. 1 will be obvious to those skilled in the art in view of the detailed description included above. Under normal voltage conditions across circuit 27, a specified potential depending upon the normal impedance of network 26 will be impressed across potential coil 19. If the power flow is in a certain predetermined direction, power directional relay 15 will operate to close contacts 21. However, tripping of circuit breaker 12 will not occur unless the corresponding electroresponsive device 16 also indicates an abnormal current condition on power line 10. If such abnormal condition amounts to a very severe fault close to the relaying station where relays 15 and electroresponsive devices 16 are located, the potential across circuit 27 may be reduced to substantially zero. If memory-action network 26 were omitted, power directional relay 15 would fail to operate because no voltage would be applied across potential coil 19 and tripping of circuit breaker 12 would not result even though the corresponding contacts 22 were closed by operation of the appropriate electroresponsive device 16. However, by virtue of memory-action network 26, which causes oscillations at system frequency to continue for a few cycles under such severe fault conditions, the potential across potential coil 19 is maintained for a few cycles after the line voltage has been reduced to substantially zero by virtue of the oscillations set up in the tuned circuit comprising network 26 and, consequently, proper functioning of power directional relay 15 is provided.

It is also desirable to obtain memory action at maximum torque of the power directional relays 15 when the angular relationship between the current $I_{19}$ and the potential E falls within the range of zero to ninety degrees lag. This result is accomplished by providing memory-action networks 26' as shown in Fig. 5 to replace the memory-action networks 26 of Fig. 1. In this case, the capacitance $C_2$ is replaced by an inductance illustrated as $L_2$ in Fig. 5. By suitably proportioning the impedances of inductance $L_2$ and capacitance $C_1$, fine adjustment being obtained by resistor $R_2$, memory action at the desired angle of lag between E and $I_{18}$ may be obtained, the impedance of capacitance $C_1$ being such as to neutralize the inductance of $L_2$ and of potential coil 19 under short-circuit conditions when network 26' is in a current-resonant condition.

From the above discussion, it will be observed that I have provided not only new and improved memory-action scheme for power directional relays but also one which provides memory action at any desired angle between the source of potential for the potential coil and the current of the current coil of the power directional relay.

While I have shown and described my invention in considerable detail, I do not desire to be limited to the exact arrangement shown but seek to cover in the appended claims all those changes and modifications which fall within the true spirit and scope of my invention.

What I claim as new and desire to secure by Letters Patent of the United States is:

1. A protective relaying system for a power circuit including a power directional responsive device having a potential winding, and circuit means for energizing said potential winding from said power circuit including a plurality of capacitors, said capacitors having such a value of capacitance that the capacitive reactance thereof when connected in parallel is substantially equal to the inductive reactance of said potential winding under all operative conditions.

2. In a protective relaying system for a power line, a power directional responsive device having a potential winding and a current winding, means for energizing said current winding from said power line, means for energizing said potential winding from said power line including a network arranged to be resonant under severe fault conditions to provide memory action for said power directional responsive device, said network being arranged so that the angular relationship between the current flowing through said potential winding and the current flowing through said current winding may be varied without substantially impairing the memory action feature of said power directional responsive device.

3. In a protective relaying system for a power line, a power directional responsive device having a potential winding and a current winding, means for energizing said current winding from said power line, means for energizing said potential winding from said power line, said last-mentioned means comprising a network including a plurality of capacitors, said capacitors having such a value of capacitance that the capacitive reactance thereof when connected in parallel is substantially equal to inductive reactance of said potential winding under all operating conditions, said network being arranged to provide a resonant circuit when a short-circuit condition exists on said power line so as to provide memory action for said power directional relay when the voltage on said power line is reduced substantially to zero.

4. In a protective relaying system for a power line, a power directional responsive device having a potential winding and a current winding, means for energizing said current winding from said power line, means for energizing said potential winding from said power line including a network comprising a plurality of capacitors for neutralizing the inductance of said potential winding to produce a current-resonant condition, said capacitors being adjustable so that the capacitive reactance of the individual capacitors varies while the total reactance thereof remains constant, whereby memory action of said power directional relay with any desired angular relationship between the current flowing through the current winding and the current flowing through the potential winding may be obtained.

5. A protective relaying system for a power circuit including a power directional responsive device having a potential winding, circuit means for energizing said potential winding from said power circuit including a plurality of reactive devices having a resultant reactance with reference to said potential winding substantially equal to the reactance of said potential winding under all operating conditions, said circuit means being so arranged as to cause oscillations at system frequency to continue in said potential winding when a short circuit condition exists on said power circuit reducing the voltage thereon substantially to zero.

6. A protective relaying system for a power circuit including a power directional responsive device having a potential winding, circuit means for energizing said potential winding from said power circuit including a plurality of adjustable reactive devices arranged so that their combined reactances with respect to said potential winding is capacitive and substantially equal to the reactance of said potential winding under all operating conditions, said circuit means being so arranged as to cause oscillations at system frequency to continue in said potential winding when a short-circuit condition exists on said power circuit, reducing the voltage thereon substantially to zero.

7. In a protective relaying system for a power line, a power directional responsive device having a potential winding and a current winding, means for energizing said current winding from said power line, means for energizing said potential winding from said power line including a network comprising a reactor and a capacitor, the net reactive effect of said reactor and capacitor relative to said potential winding being maintained at all times capacitive and of such a magnitude as to neutralize the inductance of said potential winding thereby producing resonance, said capacitor and reactor being adjustable so that the individual reactances thereof may be varied while the total net reactance thereof remains constant, whereby memory action of said power directional relay for any desirable angular relationship between zero and ninety degrees lag with respect to the current and potential of said power line may be obtained.

8. In a protective relaying system for a power line, a power directional responsive device having a potential winding and a current winding, means for energizing said current winding from said power line, means for energizing said potential winding from said power line including a network arranged to be resonant under severe fault conditions to provide memory action for said power directional responsive device, said network being arranged so that the angular relationship between the current flowing through said potential winding and the current flowing through said current winding may be varied without objectionably impairing the memory action feature of said power directional responsive device, and a variable resistance included in said network for providing adjustment of said angular relationship.

9. In combination with an alternating-current circuit, a device having a winding energized in response to the voltage of said circuit, and reactance means having a net capacitive reactance substantially equal to the inductive reactance of said winding and connected partly in series and partly in shunt with said winding.

10. In combination with an alternating-current circuit, a device having a winding energized in response to the voltage of said circuit, and capacitive means having a total capacity substantially equal to the inductance of said winding and connected partly in series and partly in shunt with said winding.

11. In combination with an alternating-current circuit, a device having a winding energized in response to the voltage of said circuit, reactance means having a net capacitive reactance substantially equal to the inductive reactance of said winding and connected partly in series and partly in shunt with said winding, and a resistor connected in parallel with the series portion of the reactance means.

ALBERT R. van C. WARRINGTON.